3,148,972
METHOD OF PREPARATION OF PURE POWDERED IRON
Lucien Peras, Billancourt, France, assignor to Regie Nationale des Usines Renault, Billancourt, France
No Drawing. Filed Mar. 10, 1961, Ser. No. 94,671
Claims priority, application France Mar. 15, 1960
3 Claims. (Cl. 75—26)

The methods of direct reduction of iron ore by gaseous process can be divided into two categories: the first, which make use of carbon monoxide alone or mixed with other gaseous elements or compounds result in the production of carburized iron having generally between 1 and 4.4% of carbon so that they can only eventually result in the production of pure melted iron by involving the additional costs of melting and refining at the steel works; the other methods which make use of pure hydrogen as the reducing agent are very costly by reason of the high cost of preparation of this gas. From another point of view, the methods of direct reduction of iron ore by gaseous process can also be divided into two classes: those which take place at high temperature to yield metallic iron in the form of blooms, sponges, or more or less agglomerated pieces unsuitable for the metallurgy of powders; the others, which operate at a temperature low enough for the iron to remain in powder form have a slow speed of reaction which renders the process costly and of poor production, to such an extent that in some of these methods, to increase the speed of reaction, the operation is carried out at a hydrogen pressure of 17 to 30 atmospheres, which is both complicated and expensive and furthermore, the pressure makes it necessary to operate in non-continuous working and by separate batches.

A new process has now been discovered which does not have any of the disadvantages indicated above. This method is characterized essentially by the fact that the reduction is carried out in two successive stages each employing entirely separate processes with respect to the reducing gas and to the range of temperature.

The ore siderite, magnetic, etc., and more particularly hematite or iron sesquioxide ($Fe_2O_3$) is heated during the first stage to a high temperature and is subjected to reduction by a gas containing essentially carbon monoxide, carbon dioxide and nitrogen, but also containing hydrogen and water vapour. This gas is in equilibrium with the monoxide FeO so that during this first stage, the reduction does not proceed further. This reduction is carried out economically although rapidly, by reason of the high temperature comprised between 700° and 1,000° C., and more generally in the vicinity of 1,000° C. It is also economical by reason of the method of preparation of gas and of heating, since the hot gas can be obtained by incomplete combustion of natural gas or of a mixture of gaseous or liquid hydrocarbons, or again of gas derived from a gas generator.

The monoxide obtained is preferably cooled rapidly or quenched, in which state it is hard but brittle, and can be economically crushed and sized so as to be reduced to the state of a very fine powder less that 0.5 mm., and preferably between 40 and 80 microns in average diameter.

The ferrous oxide in powder form is then ready for the second stage of reduction, which is effected by pure hydrogen at a temperature between 600° and 750° C. In spite of this moderate temperature, the reduction is rapid because it is carried out in a fluidized bed and because the latent heat of reduction of the ferrous oxide (FeO) is substantially smaller than those of the sesquioxide ($Fe_2O_3$) and the ferroso-ferric oxide ($Fe_3O_4$). For this reason, it has been recognized that the endothermic reaction can be effected rapidly under practical conditions in which the other oxides would only be reduced at a very slow rate. Furthermore, although hydrogen is a costly reducing agent, this method is still economical because the consumption of hydrogen is very much less for the monoxide than for the other iron oxides. Finally, the temperature should be prevented from rising too high, in order to avoid the agglomeration of the particles of iron and to permit satisfactory operation of the fluidized bed. The reduced powdered iron thus obtained is suitable for forming and compacting by the conventional methods of powder pouring and sintering.

To sum up, the method is principally characterized by reduction in two successive stages. The first stage on the crude ore takes place at high temperature, 800 to 1,000° C., using a gaseous reducing agent containing CO, $CO_2$, $N_2$, $H_2$ and $H_2O$, the content of the various gaseous constituents being as follows: CO, 4 to 20%; $H_2$, 8 to 30%; the remainder being constituted by a mixture of $CO_2$, $H_2O$ and $N_2$. This gaseous mixture is preferably obtained from the partial internal combustion of a hydrocarbon product, and is in equilibrium with the monoxide which is the only ferrous product of the reduction at high temperature.

The second stage is carried out on the ferrous oxide finely crushed and present in the form of a fluidized bed. The reduction takes place by hydrogen between 600° and 750° C., and produces powdered metallic iron practically free from carbon and suitable for subsequent conversion by the conventional methods of forming used in powder metallurgy. The carbon content is in fact less than 0.04%.

The economic advantages result on the one hand from the production of the reduction gas and the heating in the first operation, and on the other hand from the quantity of hydrogen consumed in the second operation. There are also advantages from the point of view of productivity: the first operation with internal heating at high temperature is rapid and can be carried out in apparatus of large capacity. In the second, the fluidized bed and the low endothermicity of the reaction permit a rapid reaction in spite of the limitation of temperature imposed by the necessity of obtaining powdered iron free from carbon. Finally, the advantages also relate to the equipment, for the double reason that the first stage can be carried out in a very robust apparatus while the second, that is to say the reduction by hydrogen in a fluidized bed, which is the most delicate, is effected under such conditions that for a given type and given dimensions of apparatus, the production is very greatly increased as compared with the case where the crude ore is treated directly.

Not the least of the advantages of the present method is the very much greater facility of crushing the ferrous oxide.

By way of example, Ouenza hematite ore in lumps of 10 cu. cm. was reduced by a mixture of 50% CO and 50% $CO_2$ for half an hour at 950° C.; or again with a mixture of 40% $H_2$ and 60% $H_2O$ for one hour at 950° C. In both cases, the reduction to ferrous oxide was complete right through the lumps; the latter were quenched with water and then crushed. The product thus obtained is brittle throughout its mass.

In order to show the great aptitude for crushing, two lots of identical lumps of hematite or of granular size between 10 cu. cm. and 0.5 cu. cm. were prepared. One lot was crushed in its actual state while the other was reduced, as indicated above and quenched before being crushed. In both cases the crushing was carried out in identically the same manner: for one hour in a ball-mill. The granulometric distribution compared after screening shows that the quenched monoxide is crushed much more easily than the natural hematite.

It is in fact quite easy by a succession of alternate crushing and screening operations, to bring the monoxide to a state of powder calibrated between 40 and 80 microns, which is suitable for fluidized reduction.

The reduction by hydrogen of ferrous oxide in a fluidized bed results in an iron powder of very high purity mixed with powdered gangue. A separation of the gangue from the iron shows that the iron corresponds to the following analysis: $C=0.03$, $P=0.009$, $S=0.008$, $N=0.008$, $Si=0.09$, $Mn=0.15$.

I claim:
1. A method for the production of iron in powdered form with a carbon content of less than 0.04% from natural crude iron ores in the form of lumps which comprises reacting said ores with gases containing $CO$, $CO_2$, $H_2$, $H_2O$ and $N_2$ at a temperature ranging from 700° C. to 1100° C. in order to reduce said ores into the ferrous oxide (FeO), quenching and crushing the obtained ferrous oxide and then reducing said crushed ferrous oxide, in the state of a fluidized bed, with substantially pure hydrogen under a temperature ranging from 600° C. to 750° C.

2. A method as claimed in claim 1, in which the gas employed for the first reduction stage is obtained by incomplete combustion of a fluid hydrocarbon fuel.

3. A method as claimed in claim 1, in which the reducing gas employed for said first stage has the following composition: CO, 4 to 20%; $H_2$, 8 to 30%; the remainder being constituted by a mixture of $CO_2$, $H_2O$ and $N_2$.

References Cited in the file of this patent
UNITED STATES PATENTS

| | | |
|---|---|---|
| 1,003,627 | Mathesius | Sept. 19, 1911 |
| 2,282,144 | Fahrenwald | May 5, 1942 |
| 2,547,685 | Brassert et al. | Apr. 3, 1951 |
| 2,864,688 | Reed | Dec. 16, 1958 |